United States Patent [19]

Yao et al.

[11] Patent Number: 5,394,289
[45] Date of Patent: Feb. 28, 1995

[54] FUSE OPENING LINKAGE APPARATUS FOR IMMERSION DETECTION CIRCUIT INTERRUPTER

[75] Inventors: Kelvin K. W. Yao, Edison, N.J.; Wan Y. Keung, N.T. Hong Kong, China

[73] Assignee: ROCOM Electric Co. Ltd., Hong Kong

[21] Appl. No.: 235,902

[22] Filed: May 2, 1994

[51] Int. Cl.[6] .............................................. H02H 3/16
[52] U.S. Cl. ........................................ 361/42; 361/49; 361/104; 337/239
[58] Field of Search ................... 361/42, 49, 50, 104; 337/169, 170, 239, 294; 307/326

[56] References Cited

U.S. PATENT DOCUMENTS

| | | | |
|---|---|---|---|
| 3,796,981 | 3/1974 | Doitran | 337/239 |
| 4,589,647 | 5/1986 | Gaun et al. | 361/42 |
| 4,751,603 | 6/1988 | Kwan | 361/42 |
| 4,799,124 | 1/1989 | Taylor et al. | 361/42 |
| 5,115,367 | 5/1992 | Gaus et al. | 361/49 |
| 5,159,517 | 10/1992 | Bodkin | 361/49 |
| 5,311,393 | 5/1994 | Bird | 361/104 |

*Primary Examiner*—Todd E. DeBoer
*Attorney, Agent, or Firm*—Arthur G. Yeager

[57] ABSTRACT

The interrupter includes and apparatus having a pair of oppositely rotatable, spring loaded, sharp edged elements positioned above a pair of wire fuses. Such fuses complete the current path in respective conductors of a two conductor electrical appliance power system. Each edged element is retained by a latching tension of the other fuse, so that opening of either of the two fuses releases the element above the other fuse, causing such element to rotationally descend and apply a cutting force to the other fuse and thus assist in its opening to assure that both conductors of the power system are opened in an immediately successive manner in response to a current overload.

20 Claims, 2 Drawing Sheets

FUSE OPENING LINKAGE APPARATUS FOR IMMERSION DETECTION CIRCUIT INTERRUPTER

TECHNICAL FIELD OF THE INVENTION

This invention relates to a device that is primarily designed to function as part of the interrupter section of an immersion detection circuit interrupter (IDCI) of a type that protects against electric shock by initiating an overcurrent in the power leads of an appliance when the appliance is accidentally immersed in water or other electrically conductive liquid. Such devices are disclosed in Bodkin U.S. Pat. No. 5,159,1517 and in Bodkin U.S. patent application Ser. No. 07/817,054, both of which are commonly owned.

BACKGROUND OF THE INVENTION

In the preferred embodiments of the aforementioned patent and application, an electronic circuit sensing circuit, including a sensing conductor, is located in the appliance housing together with the appliance circuitry, thus eliminating the need for a third conductor to be extended from the plug to the appliance for sensing purposes and avoiding the resulting additional length in sensor conductor that affords an undesirable increase in the reception of radiated energy which may increase the likelihood of false tripping.

In these circuits, an immersion of the appliance causes a short circuit of the power leads through a thyristor, in the sensing circuit, to create a current overload. The plug portion of the circuit includes an interrupter that reacts to the overload by opening both sides of the line.

The initiated overload creates a "crowbar" effect that not only activates the interrupter but acts to limit the current available to the load in substantially immediate fashion, prior to interruption of electrical current. This reduced shock current availability is not readily noted except when such interruption is delayed by special conditions and is of primary importance in its ability to provide protection by limiting available shock current prior to interruption in the event of such delay.

In the aforementioned patent, the overload opens a wire fuse in one side of the line, which is mechanically linked to hold spring loaded contacts closed, to complete the circuit on the other side of the line, and to release them so that they may open when the fuse opens and thus cause both sides of the line to be permanently interrupted.

In the aforementioned patent application the contacts are replaced by a second fuse and the two fuses are mechanically connected so that the opening of one provides a forceful assistance in the opening of the other.

In accordance with the present invention, which relates to the plug section of a preferred embodiment of the IDCI invention disclosed in the above mentioned patent application, the two fuses have a substantially parallel orientation in their mounting, while those in the aforementioned patent application are held at substantially right angles. Also, in the present invention, the mechanical linkage apparatus employed to assure the opening of both fuses when either opens, avoids contact of the assisting element until the moment in which opening assistance is applied. This is to be compared to the elements used to assist opening, as disclosed in the aforementioned patent application, which are in contact prior to the application of opening assistance. While this prior contact can result in more nearly simultaneous opening of the fuses, special heat resisting materials for the fuse contacting areas should be used. Also the assisting spring force is retained directly by fuse tension, rather than by a latching means, as in the present invention, limiting the amount of spring force that can be used to assist in fuse opening and requiring more careful adjustment of fuse tension than the present invention.

BRIEF SUMMARY OF THE INVENTION

This invention includes an especially reliable mechanical means of assuring interruption of both conductors in a two conductor system for transmission of electrical power from a line source to an appliance circuit, and having an electrical shock protection device that effects an interruption of power to the load circuit by automatic initiation of an overcurrent in response to immersion of the appliance in a conductive liquid. Each of the conductors has a series connected wire fuse as an interruption means responsive to the overcurrent. The wire fuses are provided with a mechanical linkage apparatus which provides interruption assistance for the other of the fuses when one fuse is opened, to assure the interruption of both fuses in the power circuit.

Preferably, the interrupter includes a pair of fast acting wire fuses, one in series with the appliance load on the ungrounded side of the power circuit, and another, also in series with the appliance load, on the grounded neutral side of the power circuit.

Preferably, the fuses have substantially equal ratings. Due to their connection in series with the load, each fuse passes the same amount of load current, or overcurrent, in the event of a short circuit that by-passes the load, such as can be initiated and established by the thyristor in the aforementioned sensor circuit, in response to an immersion condition of the appliance. While overcurrent heating brings such equally rated fuses to a nearly equal point of opening, at approximately the same time, there are differences that cannot be totally eliminated and early opening of one may relieve and protect the other. The mechanical linkage apparatus, in accordance with this invention, is designed to apply a cutting force to the other of the two fuse links when one is opened, to assist in its opening so that the opening of both fuse links and consequently the interruption of the current path in both conductors is assured and will occur within the same short period of time.

One object of this invention is to permit the use of greater force in the assisted opening of a fuse in a circuit interrupter employing a fuse in each side of a two conductor power system, and providing a mechanically assisted opening of the other fuse when one fuse is opened by current overload.

Another object is to provide a mechanical linkage apparatus operative with two fuses in a manner that does not require surface contact of the interruption assisting elements with the fuse wires before the assisting force is applied.

Still another object is to provide a means of mechanically coordinating the opening of two fuses wherein a primary spring force that drives interruption assisting elements is indirectly retained by a smaller smaller secondary force exerted by fuse wire tension and acting through a latching means.

A further object is to provide such an interrupter that is easily assembled so that manufacturing difficulties will not deter its production.

A still further object is to provide an interrupter device that is resistive to the effects of physical abuse.

An additional object is to provide protection against short circuits of a more conventional origin which have a source other than the automatic initiation due to immersion. In this sense, the improved interrupter plug additionally serves as a fused plug that will assure the opening of both sides of the line, when activated by any source of overcurrent.

BRIEF DESCRIPTION OF THE DRAWINGS

The novel features which are believed to be characteristic of this invention are set forth with particularity in the appended claims. The invention itsself, however, both as to its organization and method of operation, together with further objects and advantages thereof, may best be understood by reference to the following description taken in connection with the accompanying drawings in which:

DETAILED DESCRIPTION OF THE INVENTION

Figure 1:
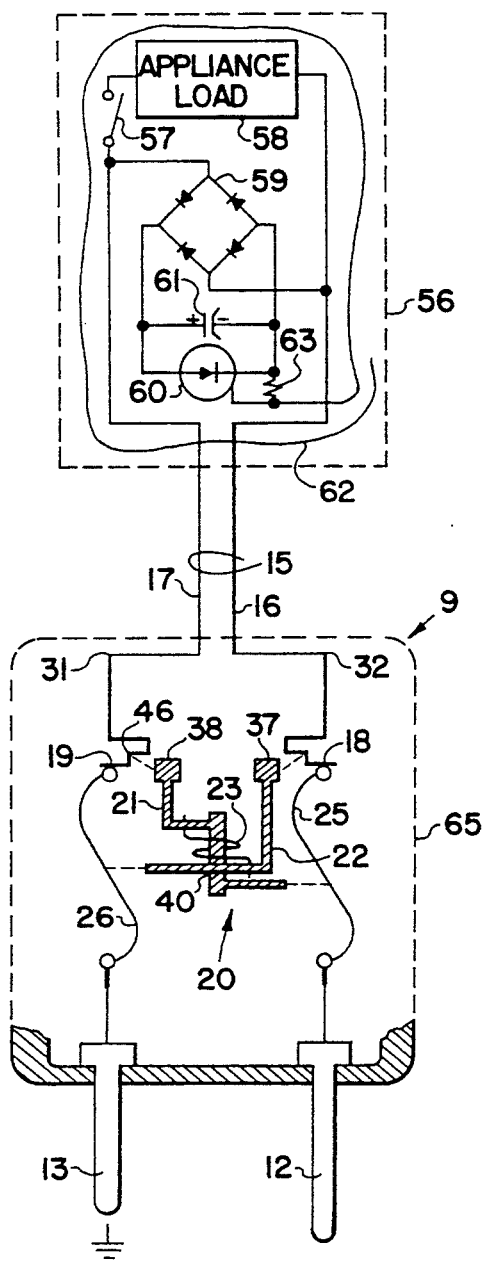
FIG. 1 is a schematic representation of an immersion detection circuit interrupter, showing an appliance circuit, sensor circuit and an interrupter plug assembly made in accord with this invention.

Referring now more particularly to the drawings, the schematic of FIG. 1, shows the appliance circuit, enclosed within housing 56 including appliance load 58, and appliance switch 57. Housing 56 also encloses the sensor circuit comprising full-wave rectifier 59, thyristor 60, capacitor 61, sensor wire 62 and resistor 63.

The appliance and sensor circuits are connected to receive power from the interrupter plug contained in plug housing 65, by line cord 15 which contains the power conductors 16 and 17. Conductor 16 is connected to the plug blade 12, intended for connection to the ungrounded terminal of receptacle outlet, through fuse 25 and its conductive spring support 18. Conductor 17 is connected to the plug blade 13, intended for connection to the grounded neutral terminal of a receptacle outlet through fuse 26 and its conductive spring support 19. The fuse interrupting apparatus 20 comprises nonconductive elements 21 and 22 and torsion spring 23.

Figure 4:
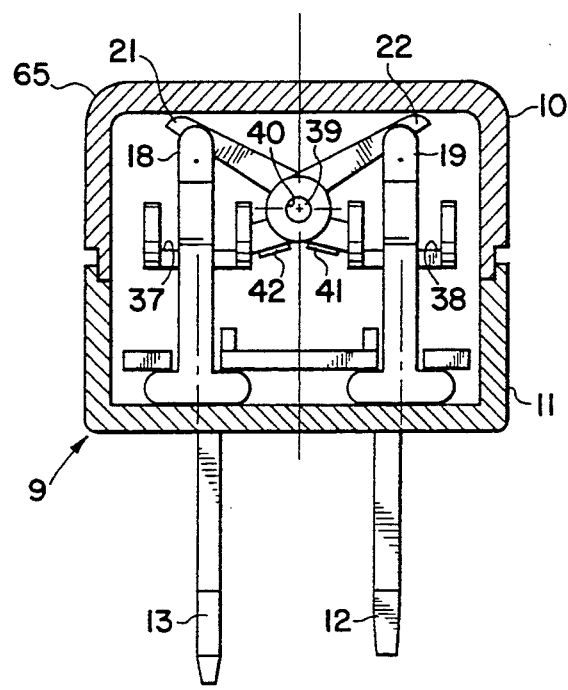
FIG. 4 is a cross-sectional end view, taken along line 4—4 of FIG. 3.
Figure 2:
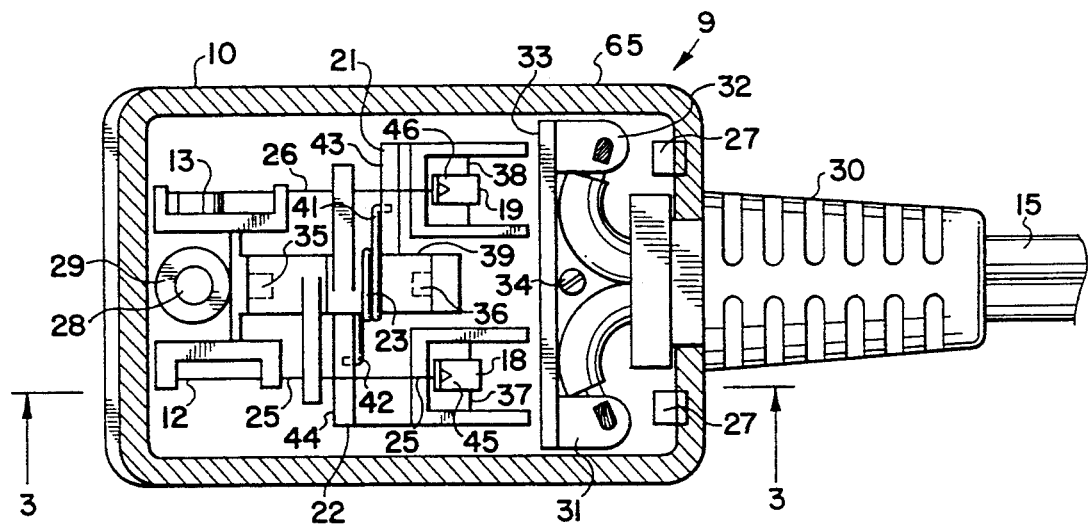
FIG. 2 is a top plan view of an interrupter plug assembly, in accordance with this invention, with the top of the housing removed for clarity.
Figure 3:
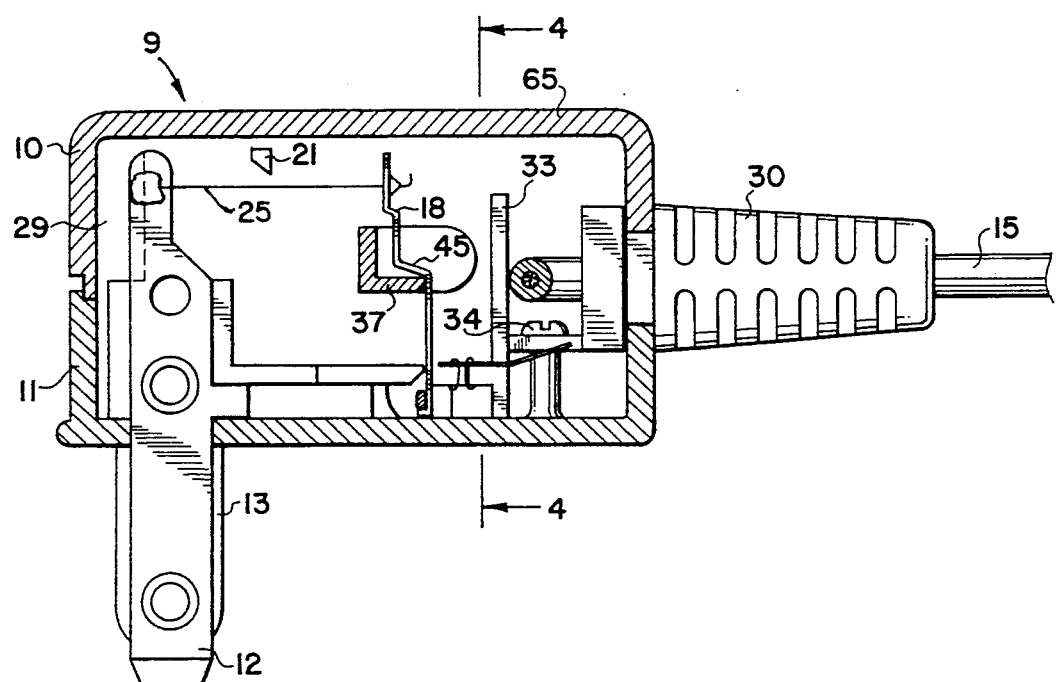
FIG. 3 is a cross-sectional view of the plug assembly taken along line 3—3 of FIG. 2.

In FIGS. 2, 3, and 4, the interrupter plug generally depicted by numeral 9, includes housing 65 which is shown to comprise an upper housing half 10 (removed for clarity in FIG. 2) secured to the bottom half 11 by means of engaging molded and spaced lug projections 27 interfitting with spaced apertures (not shown) in upper housing half 10 and by screw 28 being connected to boss 29 of upper housing half 10. It may also be seen that line cord 15, which enters through strain relief 30, receives power from ungrounded plug blade 12 and grounded neutral plug blade 13, by way of fuse wires 25 and 26 respectively. The current also passes through conductive spring fuse supports 18 and 19 respectively and their terminal elements 31 and 32.

Bracket 33 is a support structure fastened to lower housing half 11 of the housing 65 by screw 34 (shown in FIG. 3) and is the structure to which the plug blades 12 and 13 and all fixed portions of the interrupter mechanism are fastened. Bracket 33 includes a pair of oppositely extending stub shafts 35 and 36 which support the counter rotatable fuse opening assistance elements 21 and 22 at the ends of their assembly.

Fuse opening assistance element 22 is originally made integral with its latching end piece 37, while fuse opening assistance element 21 is made integral with its latching piece 38 only after assembly, since the latching piece 38 includes a shaft 39, as seen in FIG. 4, that passes through an opening 40 in element 22 which is rotatable on the shaft 39. The sharpened or knife edged opening assistance element{21 is secured to shaft 39 after it passes through the coil of torsion spring 23 and opening 40 of element 22. Torsion spring 23 has a pair of legs 41 and 42 with feet engaging beneath arms 43 and 44 and urges assembly component 21,38 and 22,37 in opposite rotational directions and must be assembled so as to be retained under tension by detents, including detents 45 and 46 in spring strip fuse supports 18 and 19 to provide a potential of primary force when latched in position by said detents under tension of a secondary force applied by fuse wires 25 and 26 respectively.

FIG. 3, shows a side view at the section indicated by line 3—3 in FIG. 2. Bracket 33 is secured to housing half 11 by screw 34. The latching end piece 37, of fuse opening assistance element 22 engages the detent 45 in spring strip fuse support 18 when the strip is pulled into latching position by the tension of fuse wire 25. The opening of fuse wire 25 releases the latching retention force on spring strip fuse support 18 so that latching end piece 37 can move up out of the detent 45 in strip 18.

FIG. 4, which is a sectional view from the line cord end of the plug, at the section indicated by line 4—4 in FIG. 3. When latching end piece 37 moves up, the sharp edged portion of fuse link opening assistance element 22 moves down, in response to the primary force of torsion spring 23, to apply a cutting assistance to the opening of fuse 26. In a like manner, opening of fuse 26 releases latching end piece 38 of the assembly 21,38 from the detent 46 in spring strip 19, allowing it to move upward in response to torsion spring 23 and bring the sharp edged portion of the assembly 21,38 down to apply a primary force in a cutting assistance to the opening of fuse 25 from torsion spring 23.

It can be readily seen that the primary torsional force exerted by spring 23 and made available to either fuse opening assistance element 21 or 22, is not transmitted to fuse elements 25 or 26. This permits the primary spring force of 23 and thus the force applied in the opening assistance to be relatively large, while only the small secondary tensile forces required to maintain spring strip fuse supports 18 and 19 in their latching positions must be borne by the fuse wires elements 25 and 26.

The advantages of this arrangement of the components are twofold. First, more uniform fuse response is achieved by using only a small secondary tensile stress on the fuse wires and also by maintaining the fuse wires out of contact with their respective fuse opening assistance surfaces until primary force is applied. Second, the ability to use a relatively greater primary force in fuse opening assistance tends to assure successful opening of both fuses, after opening of one fuse, under adverse conditions such as an unusual difference in fuse wire characteristics.

In FIGS. 3 and 4, it can be noted that the plug blades are of unequal length, as well as the expected unequal width required for polarization. This difference in length is a simple cost-free modification that appears to be useful, in conjuction with sensor circuitry, in reducing the effect of switching spikes which can be created when the plug is inserted in a receptacle outlet. This is discussed in more detail in the aforementioned issued patent and patent application. Both plug blades are within length specifications. The longer blade 12 is just below the maximum allowable length and makes first contact with the ungrounded terminal of an electrical outlet to allow an uncharged capacitor in the sensor circuitry to obtain a small charge through the earth ground capacitance effect just prior to the time the power circuit is completed by contact of the shorter, wider, grounded neutral blade 13, which is made just above the minimum allowable length.

While the invention has been described with respect to a certain specific embodiment, it will be appreciated that many modifications and changes may be made by those skilled in the art without departing from the spirit of the invention. It is intended therefore, by the appended claims, to cover all such modifications and changes as fall within the true spirit and scope of the invention.

What is claimed as new and what it is desired to secure by Letters Patent of the United States is:

1. An interrupting apparatus for a power circuit including at least two conductors for conducting electrical power from a line source to an appliance circuit, within a housing, and having an electrical shock protection device, including a sensor, within said housing, and having automatic means connected to said conductors to initiate an overcurrent in response to an immersion of the appliance circuit in water or other conductive liquid, said apparatus including an interrupting means for opening said at least two conductors, said interrupting means having at least a pair of wire fuses, respectively in said at least two conductors, and force means for assuring the immediate opening of both of said fuses to disconnect the appliance circuit from the line source, the improvement wherein said force means includes a primary force means and a secondary force means, said secondary force means being operatively associated directly with said pair of fuses, said force means including latching means for maintaining said primary force means inoperative and clear of contact with said pair of fuses, one said fuse being opened by an overcurrent, releasing said latching means of said primary force means adjacent to another said fuse link so that said primary force means forcibly completes the opening of said another fuse.

2. The apparatus as defined in claim 1 in which said primary force means includes a pair of elements each having a sharpened edge with said edges being clear of contact with said respective pair of fuses until one said element is released to apply its force to said another fuse.

3. The apparatus as defined in claim 2 wherein said force means includes means for mounting said elements in a counter rotating manner, and a torsion spring to urge said elements in opposite directions.

4. The apparatus as defined in claim 3 further comprising a pair of conductive strips with a detent in each that support said fuses and latch said elements in inoperative position by the tension of said fuses.

5. The apparatus as defined in claim 4 wherein said elements are made of nonconductive material.

6. The apparatus as defined in claim 1 wherein said at least a pair of fuses include linear fuse links, further comprising means for mounting said fuse links substantially in parallel.

7. In a power circuit including at least two conductors for conducting electrical power from a line source to an appliance circuit, contained in a plug housing and including a pair of fuses respectively in said at least two conductors together with force means for providing first and second forces to assure the immediate opening of both of said fuses to disconnect the appliance circuit from the line source, the improvement in which said first force which is of larger magnitude than said second force is held in a latched position adjacent to each of said fuses by said second force restrained by another said fuse, said first force being released by the opening of said another fuse so that whichever said fuse that responds first to an overcurrent, opens and releases the latching of said first force adjacent to its said fuse so that it may apply its force to its said fuse and assure its opening.

8. The apparatus as defined in claim 7 in which said first force of larger magnitude includes a pair of elements each having a sharpened edge with said edges being clear of contact with said respective pair of fuses until one said element is released to apply its force to said another fuse.

9. The apparatus as defined in claim 8 wherein said first force of larger magnitude includes means for mounting said elements in a counter rotating manner, and a torsion spring to urge said elements in opposite directions.

10. The apparatus as defined in claim 9 further comprising a pair of conductive strips with a detent in each that respectively support said fuses and latch said elements in inoperative position by the tension of said fuses.

11. The apparatus as defined in claim 10 wherein said elements are of nonconductive material.

12. The apparatus as defined in claim 7 wherein said at least a pair of fuses include linear fuse links, further comprising means for mounting said fuse links substantially in parallel.

13. An interrupting apparatus for a power circuit including at least two conductors for conducting electrical power from a line source to an appliance circuit within a housing, and including an electrical shock protection device having a sensor, within said housing, and having automatic means connected to said at least two conductors to initiate an overcurrent in response to an immersion of the appliance circuit in water or other conductive liquid, said apparatus including an interrupting means remote from said housing for opening said at least two conductors, said interrupting means having at least a pair of wire fuses respectively in said at least two conductors, and force means for assuring immediate opening of both of said fuses to disconnect the appliance circuit from the line source, the improvement wherein said force means includes a primary force means and a secondary force means, said secondary force means includes a pair of conductive elements operatively associated directly with respective said pair of fuses, said secondary force means further including each of said conductive elements including latching means for maintaining said primary force means inoperative and, during normal use, clear of contact with said pair of fuses, one said fuse being opened by an overcurrent which causes a release of its said latching means and release of said primary force means adjacent to another said fuse link so that said primary force means forcibly completes opening of said another fuse.

14. The apparatus as defined in claim 13 in which said primary force means includes a pair of sharpened edge elements with said edges being clear of contact with said respective pair of fuse until one is released to apply its force to said another fuse.

15. The apparatus as defined in claim 14 wherein said primary force means includes means for mounting said sharpened edge elements in a counter rotating manner, and a torsion spring to urge said sharpened edge elements in opposite directions.

16. The apparatus as defined in claim 15 wherein said latching means includes a detent in each said conductive element which supports respective said fuses, said detents maintaining said sharpened edge elements in inoperative position by tension of said fuses exerted on said conductive elements.

17. The apparatus as defined in claim 16 wherein said sharpened edge elements are of nonconductive material.

18. The apparatus as defined in claim 13 wherein said at least a pair of fuses include linear fuse links, and means for mounting said fuse links substantially in parallel.

19. The apparatus of claim 13 wherein said latching means includes a detect in each said conductive element, said primary force means includes mounting means for movably supporting a pair of cutting elements, said detents engaging said cutting elements to maintain them from engagement with said fuses during normal use of said apparatus, said detents being maintained in engagement with said cutting elements by tension of said fuses exerted on said conductive elements.

20. The apparatus of claim 19 wherein said at least a pair of fuses include linear fuse links, and means for mounting said fuse links substantially parallel and to respective said conductive elements.

* * * * *